Sept. 12, 1950  A. C. HILL  2,522,175
GRIDDLE ACCESSORY
Filed Oct. 8, 1948
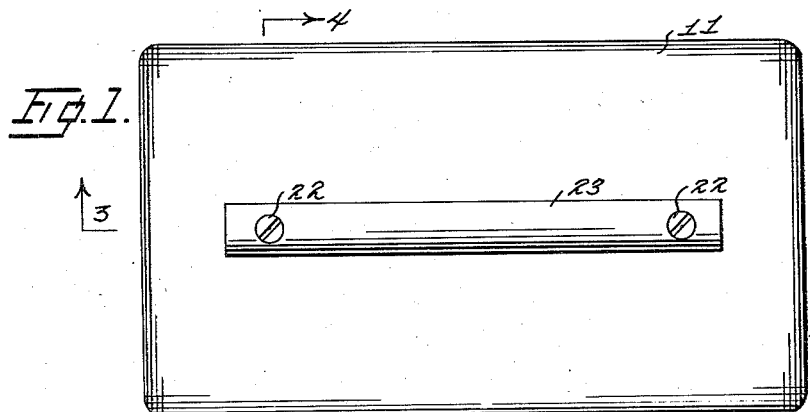
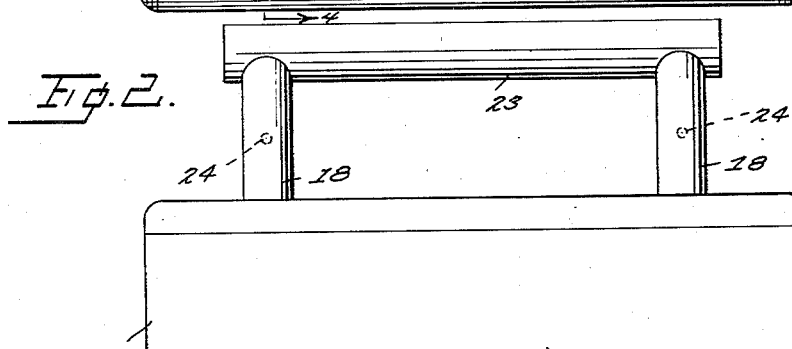
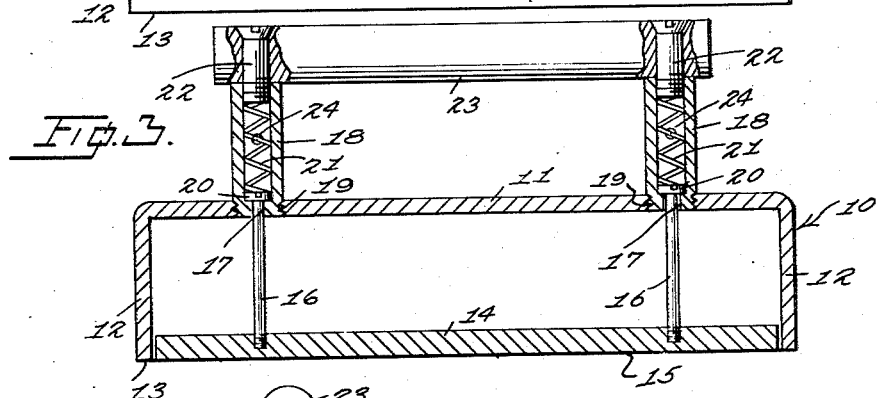
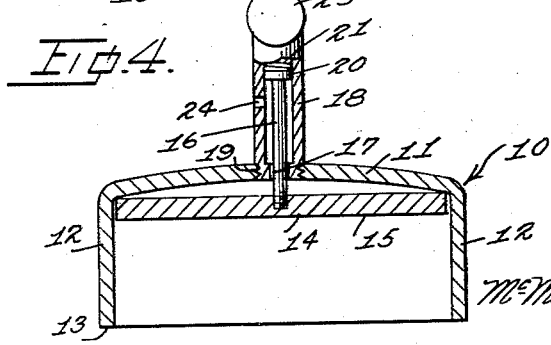
INVENTOR.
Alfred C. Hill
BY
McMorrow, Berman + Davidson
ATTORNEYS Patented Sept. 12, 1950

2,522,175

UNITED STATES PATENT OFFICE 2,522,175

GRIDDLE ACCESSORY

Alfred C. Hill, Vernon, Tex.

Application October 8, 1948, Serial No. 53,495

1 Claim. (Cl. 99—349)

My invention relates to accessories for cooking griddles. As is well known, in cooking a comestible, such as steaks, chops or the like, on a grill or a griddle, it is customary to sear the comestible on both sides prior to cooking it for a predetermined period of time upon each side. This well known practice requires the turning of the comestible at least twice and is a relatively slow cooking process.

With the foregoing in view, it is an object of my invention to provide an improved griddle accessory which provides for searing of the comestible on both sides simultaneously and likewise the grilling of the same on both sides simultaneously, whereby to materially reduce the cooking time and to more effectively seal the juices in the comestible.

Other objects and advantages reside in the particular structure of the invention, combination and arrangement of the several parts thereof, and will be readily understood by those skilled in the art upon reference to the attached drawing in connection with the following specification, wherein the invention is shown, described and claimed.

In the drawing:

Figure 1 is a plan view of an accessory to the invention;

Figure 2 is an elevation thereof;

Figure 3 is a longitudinal vertical sectional view taken substantially on the plane of the line 3—3 of Figure 1;

Figure 4 is a transverse vertical sectional view taken substantially on the plane of the line 4—4 of Figure 1, but showing the parts in a different position.

Referring specifically to the drawing, wherein like reference characters have been used throughout the several views to designate like parts, 10 designates generally the accessory according to the invention, which comprises a housing having a top wall 11 and continuous side walls 12 terminating in free lower edges 13 adapted to rest atop any suitable griddle or grill, not shown. The housing 10 is open at the bottom and encloses a weight 14 which is substantially complementary to the shape of the interior of the housing and which is formed with a flat under surface 15. The weight 14 is mounted for vertical sliding movement inwardly of the housing to and from the position shown in Figure 3, where it rests atop the griddle to be heated by the latter, and the position shown in Figure 4, where it rests atop a comestible, not shown, enclosed by the housing and resting atop the griddle.

Thus, by allowing the under surface 15 of the weight 14 to rest atop a griddle for a period of time while the griddle is being heated, the weight 14 becomes heated to the same extent as the griddle. Thereafter, the housing 10 is removed from the griddle and the comestible placed thereon. The housing 10 is now placed about the comestible so that the under surface 15 of the plate or weight 14 rests atop the comestible. Thus, the comestible is seared simultaneously on both sides by the griddle and by the under surface of the weight 14. Likewise, by virtue of the enclosing sides 12, the comestible is cooked on both sides simultaneously as heat is transferred to the weight 14 in sufficient quantities to maintain the same in a heated condition. Thus, the enclosed comestible is rapidly cooked with a minimum of juice loss.

To mount the weight 14 in any housing 10, there has been provided a pair of studs 16, the lower ends of which are threaded into the upper part of the weight 14. The studs 16 comprise guide rods which are vertically slidable through oversize openings 17 formed in the closed lower ends of a pair of tubular guides 18. The lower ends of the guides 18 may be exteriorly threaded, as at 19, for threaded engagement in complementary holes formed in the top wall 11 of the housing. The guide rods 16 may be provided with heads 20 providing limit stops for limiting downward sliding movement of the rods relative to the guides 18. Likewise, the guides 18 preferably include expansive coil springs 21 engageable with the heads 20 for loading the guide rods 16 and the weight 14 for downward sliding movement to the Figure 3 position. The upper ends of the guides 18 are preferably closed by screw plugs 22 threaded therein which likewise comprise means for attaching any suitable handle 23 to the guides 18. Because of the loose fit of the weight 14 in the housing 10, and also on account of the oversize holes 17 in the lower ends of the guides 18, the interiors of the guides 18 are in open communication with the interior of the housing. To provide means for venting steam from the interior of the housing, the guides 18 are each provided with one or more laterally-directed steam vents 24.

At the same time, by locating the vents 24 remotely of the griddle, the majority of the steam will condense before reaching the vents whereby to baste the meat while it is being cooked.

While I have shown and described what is now thought to be a preferred embodiment of the invention, it is to be understood that the same is susceptible of other forms and expressions. Consequently, I do not limit myself to the precise structure shown and described hereinabove except as hereinafter claimed.

I claim:

A griddle accessory, comprising a housing including a top wall and depending side walls, said side walls having free lower edges adapted to seat atop a griddle, a weight enclosed by said side walls, said weight having a flat under surface, means mounting said weight in said housing for vertical sliding movement relative thereto, said means including a pair of spaced and parallel guide rods fixed on said weight and extending upwardly thereof, a pair of spaced and parallel tubular guides fixed to said top wall and extending upwardly therefrom, said guide rods being slidable in said guides, springs in said guides arranged to urge said guide rods downwardly, said guides being in open communication with the interior of said housing, said guides being formed with laterally-directed steam vents, a handle fixed to said guides in upwardly-spaced relation to and parallel to said top wall, said under surface of said weight being adapted at times to rest atop the griddle to be heated thereby and at times to rest atop a comestible on said griddle enclosed by said housing.

ALFRED C. HILL.

REFERENCES CITED

The following references are of record in the file of this patent:

UNITED STATES PATENTS

| Number | Name | Date |
|---|---|---|
| 1,624,214 | Cannon | Apr. 12, 1927 |
| 1,856,564 | Kipper | May 3, 1932 |
| 1,962,877 | Roth et al. | June 12, 1934 |
| 2,040,676 | Stevens et al. | May 12, 1936 |
| 2,423,963 | Coffman | July 15, 1947 |